Figure 1:
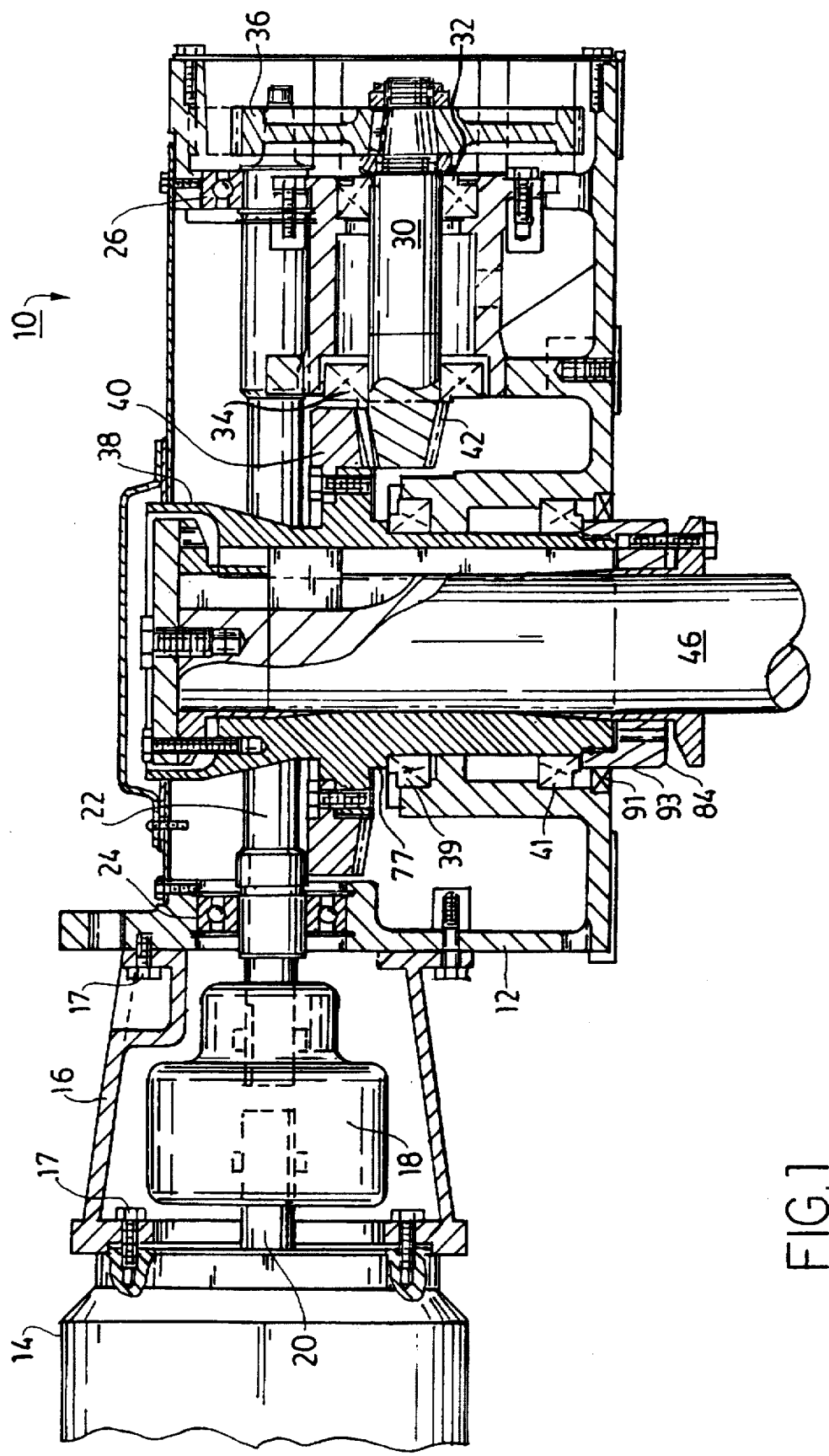

United States Patent [19]

Hutchings et al.

[11] Patent Number: 5,746,536
[45] Date of Patent: May 5, 1998

[54] DOUBLE TAPER LOCK SYSTEM FOR A LOCKING A MIXER SHAFT IN A QUILL

[76] Inventors: William F. Hutchings, 19 Cannock Dr., Fairport, N.Y. 14450; Marlin D. Schutte, 40 Corwin Rd., Rochester, N.Y. 14610; Stephen L. Markle, 69 South Main St., Holley, N.Y. 14470; Joel S. Berg, 532 Parma Center Rd., Hilton, N.Y. 14468; David J. Engel, 9687 Purcell Hill Rd., Springwater, N.Y. 14560

[21] Appl. No.: 739,739

[22] Filed: Nov. 7, 1996

[51] Int. Cl.[6] ..................................... F16B 3/06
[52] U.S. Cl. ..................... 403/370; 403/358; 403/374
[58] Field of Search ........................... 403/370, 368, 403/367, 373, 374, 355, 356, 358; 366/331

[56] References Cited

U.S. PATENT DOCUMENTS

| | | | |
|---|---|---|---|
| 1,822,945 | 9/1931 | Weis | 403/370 X |
| 1,891,405 | 12/1932 | Ericksson | 403/370 X |
| 2,968,487 | 1/1961 | Glynn | |
| 3,058,386 | 10/1962 | Morrow | |
| 3,182,986 | 5/1965 | Brockman | 403/370 X |
| 3,257,070 | 6/1966 | Kuklinski | 403/370 X |
| 3,279,870 | 10/1966 | Janiszewski | 403/370 X |
| 3,531,216 | 9/1970 | Callahan | 403/370 X |
| 3,877,706 | 4/1975 | Haas et al. | |
| 3,893,779 | 7/1975 | Schroeter | 403/370 |
| 4,208,147 | 6/1980 | Giege et al. | |
| 4,304,502 | 12/1981 | Stratienko | 403/370 |
| 5,009,539 | 4/1991 | Muellenberg | |
| 5,123,771 | 6/1992 | Okuno | |
| 5,152,606 | 10/1992 | Borraccia et al. | |
| 5,174,680 | 12/1992 | Nakamura et al. | 403/370 |
| 5,507,587 | 4/1996 | Matsumoto | |

Primary Examiner—Kenneth J. Dorner
Assistant Examiner—William L. Miller
Attorney, Agent, or Firm—M. Lukache

[57] ABSTRACT

A system for automatically centering and rigidly retaining a mixer shaft in a mixer drive. A hollow quill in a mixer drive is provided with an axial bore having a first diameter along a central portion thereof and tapering linearly and axially in opposite directions away from the central portion with increasing diameter to define a pair of opposed conical portions of the axial bore on either side of the central bore. A smooth-surface cylindrical mixer shaft inserted into the bore is retained by the tightening of upper and lower tapered cylindrical locks which are slidable along the mixer shaft and have conical outer surfaces which are matable with the upper and lower conical portions of the quill bore. The locks, when urged into wedged relationship between the shaft and the quill bore, automatically center the shaft in the quill in rigid retention. The upper end of the shaft is provided with a thrust plate secured by throughbolts into the quill to press the upper lock into locking relationship. At the lower end of the quill, a bearing retainer ring threaded onto the outer surface of the quill is bored to receive bolts extending through a flange on the lower lock to press the lower lock into locking relationship. The rigidity of the lock increases the first critical frequency of the mixer system and therefore permits operation at high speeds, including rotational frequencies greater than the first critical (natural) frequency of the mixer system.

10 Claims, 2 Drawing Sheets

DOUBLE TAPER LOCK SYSTEM FOR A LOCKING A MIXER SHAFT IN A QUILL

The present invention relates to apparatus for driving a mixer particularly to apparatus for connecting a mixer shaft to a drive means such as a reduction gearing from an electric motor, and most particularly to a system for centering and rigidly securing a mixer shaft within a driven quill in a mixer drive assembly.

Typically, a drive assembly for turning a mixer shaft uses a rugged cast housing containing a transmission including a train of gears mounted on rotatable shafts, which train can transmit torque from the output shaft of an electric motor mounted on the housing to a rotatable quill. A quill is a generally cylindrical member disposed for rotation in one or more bearings within the housing, having an axial bore for receiving a mixer shaft and having an integral equatorial gear, known also as a bull gear, which is the ultimate gear in the train. To reduce overall height of the drive assembly, it is known to dispose the motor and gear shafts orthogonally to the axis of the quill and mixer shaft, and to connect the shaft gears to the quill via helicut bevel gears.

A long-standing problem in the art is how to connect a smooth-surfaced cylindrical mixer shaft into a quill so that the shaft is a) firmly retained, b) centered within the quill to rotate coaxially therewith, and c) readily removable from the quill. Typically in the art, this requires means for embracing the shaft within the quill in at least two separate locations along the length of the shaft and quill.

As used herein, the term "smooth-surfaced shaft" means a generally rod-shaped shaft having an outer surface, in the shaft portion extending into a quill, which is unfeatured by threads or equatorial grooves by which means purchase may be obtained on the shaft for retaining the shaft in the quill; and further, that the shaft has no steps or tapered-diameter portions to create stress risers. A shaft having longitudinal flutes or splines for rotationally locking the shaft to the quill is considered "smooth-surfaced" within this definition if the surface portions between the flutes or splines are discontinuous elements of an otherwise generally cylindrical surface.

A tapered lock for a mixer shaft is disclosed in U.S. Pat. No. 3,877,706, FIG. 1, wherein a tapered portion of the shaft is drawn into a mating tapered quill portion at the lower end of the quill bore by bolts extending into the quill through a thrust plate mounted on the upper end of the mixer shaft. Thus the shaft is taper-centered in the quill only at the lower end, and the shaft must be machined to provide the taper.

It is known further in the art of shaft engagement to use a double taper lock, as disclosed in U.S. Pat. No. 3,058,386, wherein upper and lower conical elements are axially movable along threaded portions of a rod to create a binding relationship with a bore having mating conical portions and slidably receiving the rod. This mounting technique is unsuitable for smooth-surface shafts, since the mixer shaft must be threaded along two portions of its surface.

U.S. Pat. No. 4,208,147 discloses a plurality of pairs of interlocking tapered elements to secure a roll shaft in a roll ring. This technique can accommodate a smooth-surface cylindrical shaft, but two mating pairs of "wedge-type centering sleeves" are required, or four in all, to secure the shaft at two separate locations along its length.

Some other examples of the use of tapered elements on shafts are disclosed in U.S. Pat. Nos. 2,698,487; 5,009,539; 5,152,606; and 5,507,587.

Thus a need exists for an improved locking system for retaining a smooth-surface cylindrical mixer shaft in a quill so that the shaft is automatically centered and is readily removable.

A related problem in mixer construction is the elimination of play in the system for mounting the impeller on the shaft and coupling the shaft to the mixer drive. In many known configurations, required clearances in various linkages and couplings of the mixer shaft can give rise to unacceptable dynamic instabilities in the system during operation which can restrict operation to rotational frequencies lower than the first critical harmonic (the natural frequency) of the system. This is especially a problem for relatively large mixers having shafts, for example, 3 inches in diameter and 20 feet in length, and it can be a severe limitation in those process applications in which higher mixer speeds would be beneficial to the process. In many applications, and particularly those wherein a relatively long mixer shaft is required, higher mixer speeds are achieved through use of thicker and heavier shafts, and proportionally larger drive assemblies, whereby the natural frequency of the system is raised above the rotational frequency of interest. Bigger, heavier shafts and drive assemblies are in general more costly and are more difficult to work with. Lighter assemblies with thinner shafts are in general more desirable.

It is a principal object of the invention to provide an improved system for automatically centering a cylindrical mixer shaft in a quill.

It is a further object of the invention to provide an improved system for locking such a mixer shaft in centered relationship in a quill at two spaced-apart locations along the length of the shaft.

It is a still further object of the invention to provide an improved system for retaining a mixer shaft in centered relationship in a quill wherein the shaft is readily separable from the quill.

It is a still further object of the invention to provide an improved system for locking a mixer shaft in a quill such that the first critical harmonic of the mixer system is increased and the mixer may be operated safely at high rotational frequencies because of the increased critical frequency of the locking system for the mixer shaft.

It is a still further object of the invention to provide an improved system for mixing wherein cross-sectionally thin mixing shafts and lightweight drive assemblies can be operated at high speeds without excessive dynamic instabilities.

Briefly described, a mixer system embodying the invention has a generally tubular quill having an axial bore disposed to receive a smooth-surface cylindrical mixer shaft and to be rotationally driven in known fashion by an electric motor and gear train. The bore of the quill is tapered outward to a larger diameter near its upper and lower entrances to define opposing spaced-apart upper and lower tapered locking surfaces. A cylindrical mixer shaft disposed at its upper end within the quill bore is rotationally keyed to the quill and is centered and retained therein by generally cylindrical and opposing upper and lower taper locks, each comprising a cylindrical wedge having substantially the same inner diameter as the outer diameter of the shaft and the substantially the same cone angle on its outer surface as the angle of taper in the respective matable quill bore. The upper end of the mixer shaft is provided with a transverse thrust plate to urge the upper lock into wedged relationship between the shaft and the upper locking surface of the quill, and bolts extending through the thrust plate and a flange on the lock are threaded into the quill to load the upper lock to any desired torque. The lower end of the quill may be similarly configured, although without a thrust plate. The lower lock may be bolted directly into bores in the bottom of the quill.

or a thrust ring can be used between the bolt heads and the flange to distribute the axial load on the lock evenly over the flange.

In a preferred embodiment, the lower end of the quill is threaded on its outer surface to receive a threaded ring for retaining and loading a lower quill bearing. The bearing retainer ring extends inwards over the end of the quill and defines an open quill cap, the mixer shaft and lower taper lock extending therethrough. The retainer ring is provided with threaded bores, permitting the lower taper lock to be drawn snugly by bolts into wedged relationship between the shaft and the lower locking surface of the quill bore.

So installed, the two opposing locks act together to rigidly retain the mixer shaft coaxially with the quill at two spaced apart locations along the length of the shaft and quill, whereby sources of dynamic instability in the shaft mounting mechanism are eliminated.

An advantage of a system in accordance with the invention is that much longer mixer shafts can be used at a given torque without introduction of unwanted and dangerous vibrations.

A further advantage of such a system is that the mixer shaft diameter is independent of the quill bore diameter, provided only that the former is smaller than the latter. Shafts of different diameters may be accommodated in a given quill by providing taper locks of appropriate thickness. This permits, for example, a single quill to be manufactured and sold for use with either metric or English diameter shafts.

A further advantage of such a system is that the very rigid clamping of the shaft over a relatively long distance permits an overall reduction in length of the quill and a concomitant reduction in height of the gearbox.

Figure 2:
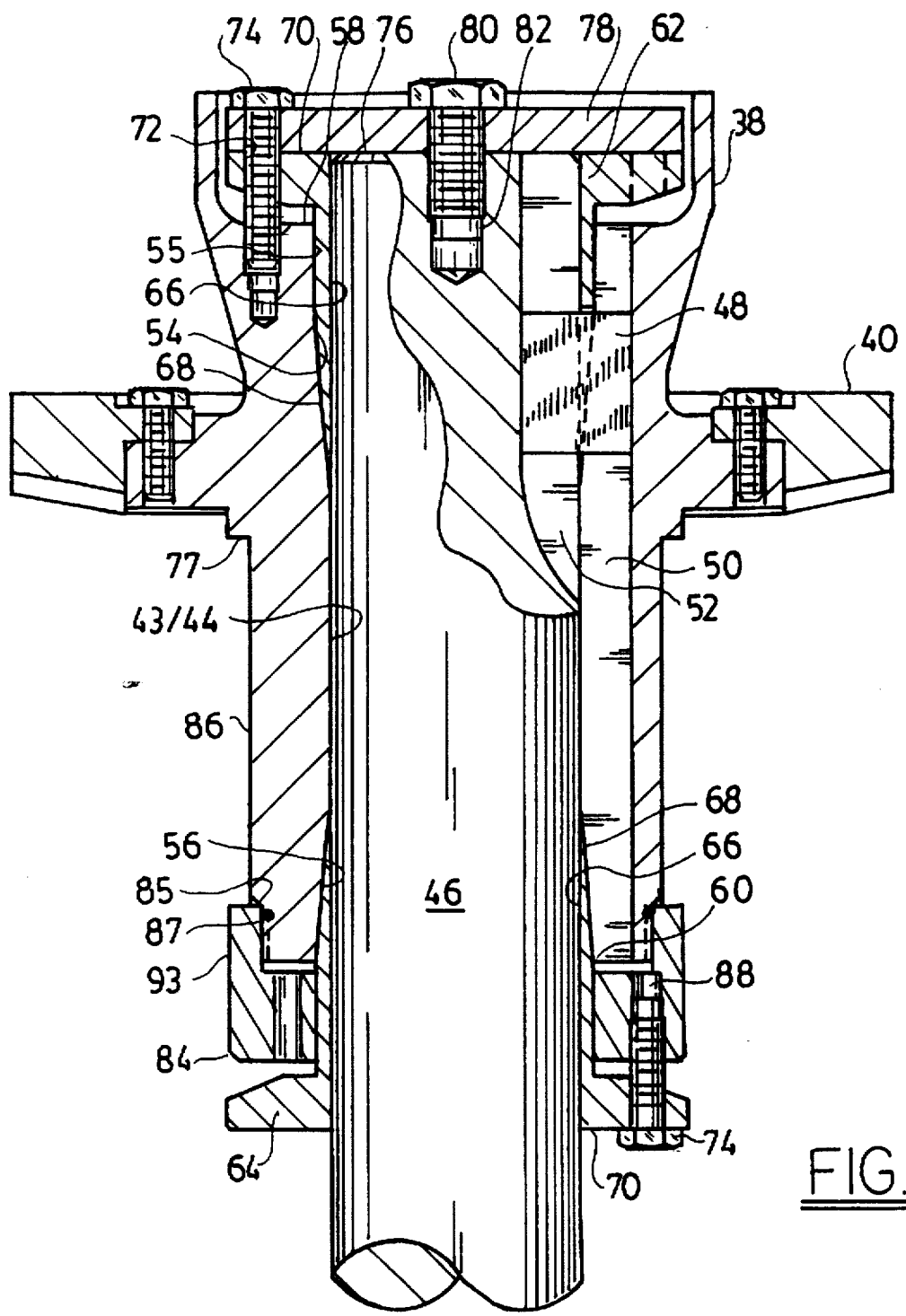

The foregoing and other objects, features, and advantages of the invention, as well as a presently preferred embodiment thereof, will become more apparent from a reading of the following description in connection with the accompanying drawings in which:

FIG. 1 is an elevational view, partially in cross-section, of a mixer drive assembly with a double taper shaft lock system in accordance with the invention; and FIG. 2 is an enlarged and detailed elevational view, partially in cross-section, of the double taper shaft lock system shown in FIG. 1.

Referring to FIGS. 1 and 2, there is shown a mixer drive assembly 10 including a gearcase or housing 12 supporting an electric motor 14 secured to the housing by standoff 16 and bolts 17. A coupling 18 connects motor shaft 20 coaxially with a first cross-shaft 22. Cross-shaft 22 is mounted for rotation in first and second cross-shaft bearings 24 and 26, respectively, and is provided near its end opposite motor 14 with a pinion gear (not visible in FIG. 1). A second cross-shaft 30 is mounted for rotation in indirect bearings 32 and 34, and is fitted at its outer end with a gear 36 which is drivingly engaged by the pinion gear. "Indirect" refers to the gear being mounted on an unsupported, cantilevered portion of the shaft outboard of the bearings. A shaft holder comprising a hollow quill 38 is rotatably disposed in upper and lower quill bearings 39 and 41, respectively, within housing 12, the axial orientation of the quill being substantially orthogonal to the axial direction of the first and second cross-shafts. Quill 38 is provided with an equatorial ring gear 40 which meshes in driving relationship with a bevel-cut pinion gear 42 mounted on the inner end of second cross-shaft 30. Thus quill 38 is driveable in double gear reduction by motor 14.

In accordance with the invention, quill 38 is provided with an axial bore 43 having a first diameter 44 along a central portion of the bore. Diameter 44 is substantially identical with, or slightly smaller than, the outer diameter of mixer shaft 46 such that the unrestrained mixer shaft can slide freely within the quill bore 43. Preferably, shaft 46 is rotatably connected to quill 38 via key 48 which is disposed in opposed keyways 50 and 52 in the shaft and quill, respectively. Of course, other connections are possible, for example, the shaft and quill can be splined together provided that the surfaces of the mixer shaft and quill bore 43 between the splines are smooth, cylindrical surfaces.

The bore of quill 38 is provided with an upper tapered portion 54 and a lower tapered portion 56 near the upper and lower entrances thereof. 58 and 60, respectively, which portions preferably are uniformly tapered in increasing diameter toward the entrances to provide preferably conical locking surfaces. The upper and lower taper angles formed between the cylindrical central portion 43 and the tapered portions 54 and 56 may be the same or different. The portion 55 of the bore between locking surface 54 and the entrance may be conical or other shape such as cylindrical, as shown.

Upper taper lock 62 and lower taper lock 64 are similar and may be identical. Each has a cylindrical inner bore 66 which is only slightly larger in diameter than shaft diameter 44, e.g., 0.001 to 0.003 inch larger, permitting the lock to slide on the shaft when the lock is unconstrained but to grip the shaft when radially compressed. Each lock has a tapered outer surface 68, preferably conical and preferably substantially identical with the taper of upper tapered portion 54 and/or the taper of lower tapered portion 56 of the quill bore. Thus the angle of taper between the cylindrical bore 66 and the outer surface 68 is preferably identical with the angles of taper of portions 54 and 56 in the quill bore. Preferably, the cylindrical inner bore 66 is relieved to a slightly larger diameter over a portion of the lock beyond the axially tapered outer surface 68 to control the location of wedging contact and the resulting contact stress.

Each taper lock also has circular equatorial flange 70 provided with a plurality of bores 72 to receive a plurality of mounting bolts 74 therethrough, preferably three 120° apart. The upper lock may be slotted (not visible in FIGS. 1 and 2) to accommodate key 48 during assembly.

The upper end 76 of mixer shaft 46 is provided with a transverse thrust plate 78 secured to the mixer shaft by bolt 80 in an axial threaded bore 82. Thrust plate 78 is substantially the same diameter as, and mates with, flange 70. Tightening of upper bolts 74 urges upper lock 62 into centered and rigid relationship with upper tapered portion 54, the tapered portion of the lock being slightly compressed to form essentially a swage fit between the shaft and the quill. The lock may be loaded to any desired torque on upper bolts 74. Of course, in some applications, flange 70 may be bolted directly to the quill to retain the mixer shaft axially in the quill solely by the action of the taper lock, and the thrust plate may be omitted.

Upper quill bearing 39 is retained axially in housing 12 by a flange 77 on quill 38. Lower quill bearing 41 is retained axially by a bearing retainer ring 84 threadably mounted in a step 85 on the outer surface 86 of quill 38. An O-ring 87 in a groove in the quill seals the threads against lubricant leakage from bearing 41. A conventional ring seal 91 runs against the outer surface 93 of ring 84 to prevent exchange of process fluids being mixed and bearing lubricant. The distance between flange 77 and step 85 is selected to provide a desired level of axial preload on the bearings when retainer ring 84 is screwed down tight against step 85.

Retainer ring 84 surrounds shaft 46, the opening therein being of sufficient diameter to accommodate the shaft and at least the tapered portion of lower taper lock 64. Ring 84 is provided with a plurality of threaded bolt holes 88 to receive lower mounting bolts 74 which also may be three bolts 120° apart. Tightening of lower bolts 74 urges lower lock 64 into centered and rigid relationship with lower tapered portion 56. The lower lock may be loaded to any desired torque on lower bolts 74.

In the preferred embodiment, ring 84 thus performs four functions: a bearing retainer; a thrust ring for the lower taper lock; an O-ring retainer; and a sealing surface for a dynamic seal. Of course, within the scope of the invention, the bearings may be retained in some other way, such as by a snap ring, and the member presently defined as a threaded retainer ring can be simply the lower end of the quill into which flange 70 can be bolted directly.

The mixer shaft is readily removed from the quill by the removal of upper and lower mounting bolts 74, thrust plate 78, and upper and lower locks 62 and 64.

When assembled, the opposed upper and lower taper locks of the system rigidly and automatically retain the mixer shaft in fixed, coaxial relationship with the quill, thereby preventing shaft runout or wobble and permitting the operation of the mixer at rotational frequencies at or above the first critical frequency of the the mixer.

From the foregoing description it will be apparent that there has been provided an improved system for mounting a shaft in a shaft holder, and particularly a mixer shaft in a quill, wherein spaced-apart and opposed upper and lower taper locks secure the shaft in rigid, centered relationship within the shaft holder, or quill. Variations and modifications of the herein described improved system, in accordance with the invention, will undoubtedly suggest themselves to those skilled in this art. Accordingly, the foregoing description should be taken as illustrative and not in a limiting sense.

What is claimed is:

1. A double taper lock system for coaxially centering and retaining a mixer shaft disposed in a mixer drive quill, comprising:
   a) the quill having an axial bore receivable of the mixer shaft, said bore including a central cylindrical portion having a first diameter and a first portion tapering in increasing diameter from said central portion toward an end of said bore and a second portion tapering in increasing diameter from said central portion toward the opposite end of said bore;
   b) a first taper lock having a cylindrical bore receivable of the mixer shaft and an outer surface concentric with said bore and tapered in diameter in an axial direction to define a first tapered surface substantially identical with said first tapered portion in said quill;
   c) a second taper lock having a cylindrical bore receivable of the mixer shaft and an outer surface concentric with said bore and tapered in diameter in an axial direction to define a second tapered surface substantially identical with said second tapered portion in said quill, at least one of said first and second taper locks including a circular flange extending radially over at least a portion of one of said ends of said quill bore, and at least one of said first and second taper locks extending beyond the corresponding end of said quill bore;
   d) first means reactive against said quill for urging said first taper lock toward said second taper lock; and
   e) second means reactive against said quill for urging said second taper lock toward said first taper lock, at least one of said first and second means for urging including a removable ring attachable to an end of said quill, said ring and said circular flange on said taper lock having a plurality of matching bores for receiving bolts, the ring bores being threaded, the flange and ring being spaced apart, and the tightening of said bolts urging said taper lock through said ring into said quill bore.

2. The system in accordance with claim 1 wherein said removable ring is a quill bearing retainer.

3. The system in accordance with claim 1 further comprising a key disposed in a keyway in said quill bore.

4. The system in accordance with claim 1 wherein said first tapered portion in said quill bore is conical.

5. The system in accordance with claim 1 wherein said second tapered portion in said quill bore is conical.

6. The system in accordance with claim 1 wherein said first tapered outer surface of said first taper lock is conical.

7. The system in accordance with claim 1 wherein said second tapered outer surface of said second taper lock is conical.

8. The system in accordance with claim 1 wherein the angle of taper of said first tapered portion in said quill bore is substantially the same as the angle of taper of said outer surface of said first taper lock.

9. The system in accordance with claim 1 wherein the angle of taper of said second tapered portion in said quill bore is substantially the same as the angle of taper of said outer surface of said second taper lock.

10. The system in accordance with claim 1 wherein at least one of said first and second means for urging comprises a transverse plate outboard of and in contact with one of said first and second taper locks, and a plurality of bolts extending through said plate and into matching bores in said quill, tightening of said bolts causing said plate to urge said taper lock into said quill bore.

* * * * *